United States Patent
Osawa et al.

(10) Patent No.: US 8,475,608 B2
(45) Date of Patent: Jul. 2, 2013

(54) MAGNESIUM-BASED HYDROGEN STORAGE ALLOYS

(75) Inventors: Masahito Osawa, Ibaraki (JP); Hidenori Tomioka, Tokyo (JP); Naoyoshi Terashita, Ibaraki (JP); Noboru Hayami, Tokyo (JP); Shigeru Tsunokake, Tokyo (JP)

(73) Assignee: Japan Metals and Chemicals Co., Ltd., Tokyo (JP)

( * ) Notice: Subject to any disclaimer, the term of this patent is extended or adjusted under 35 U.S.C. 154(b) by 2214 days.

(21) Appl. No.: 11/286,356

(22) Filed: Nov. 25, 2005

(65) Prior Publication Data

US 2006/0073066 A1  Apr. 6, 2006

Related U.S. Application Data

(63) Continuation of application No. 10/131,209, filed on Apr. 25, 2002, now abandoned.

(30) Foreign Application Priority Data

Apr. 26, 2001 (JP) ................ 2001-128555

(51) Int. Cl.
*C22C 23/00* (2006.01)
(52) U.S. Cl.
USPC ........... 148/420; 148/406; 420/405; 420/406; 420/407; 420/408; 420/409; 420/410; 420/411; 420/412; 420/413; 420/414
(58) Field of Classification Search
USPC ..... 148/31, 421, 442, 420, 406; 420/405–414
See application file for complete search history.

(56) References Cited

U.S. PATENT DOCUMENTS

| | | |
|---|---|---|
| 2,659,131 A | 11/1953 | Leontis et al. |
| 3,496,035 A | 2/1970 | Foerster |
| 3,617,395 A | 11/1971 | Ford |
| 4,200,624 A | 4/1980 | Muller et al. |
| 4,228,145 A | 10/1980 | Gamo et al. |
| 4,623,597 A | 11/1986 | Sapru et al. |
| 4,718,475 A | 1/1988 | Das et al. |
| 4,857,109 A | 8/1989 | Das et al. |
| 5,199,972 A | 4/1993 | Bogdanovic |
| 5,340,416 A | 8/1994 | Shibata et al. |
| 5,498,402 A | 3/1996 | Bogdanovic et al. |
| 5,576,118 A | 11/1996 | Zhang et al. |
| 5,679,182 A | 10/1997 | Marder et al. |
| 5,895,518 A | 4/1999 | Guthrie et al. |

(Continued)

FOREIGN PATENT DOCUMENTS

| | | |
|---|---|---|
| JP | 50145359 | * 11/1975 |
| JP | 56-037201 | 4/1981 |

OTHER PUBLICATIONS

English Language abstract of JP 56-037201.

(Continued)

*Primary Examiner* — Sikyin Ip
(74) *Attorney, Agent, or Firm* — Greenblum & Bernstein, P.L.C.

(57) ABSTRACT

Magnesium-based hydrogen storage alloys having metallic magnesium (Mg) and a magnesium-containing intermetallic compound ($Mg_xM_y$, wherein y is 1−x) and containing not less than 60 mass-% of magnesium in total, and having a phase of a primarily crystallized magnesium-containing intermetallic compound in its solidification structure.

11 Claims, 3 Drawing Sheets

U.S. PATENT DOCUMENTS 5,962,165 A 10/1999 Tsuruta et al.
5,964,965 A 10/1999 Schulz et al.
5,976,276 A 11/1999 Sapru et al.
6,103,024 A 8/2000 Sapru et al.
6,193,929 B1 2/2001 Ovshinsky et al.

OTHER PUBLICATIONS

Hansen, Max, and Kurt Anderko. *Constitution of Binary Alloys*. New York: McGraw-Hill Book Company: 1958. pp. 909-911.

* cited by examiner

MAGNESIUM-BASED HYDROGEN STORAGE ALLOYS

CROSS-REFERENCE TO RELATED APPLICATIONS

The present application is a continuation of U.S. application Ser. No. 10/131,209, filed Apr. 25, 2002, now abandoned, the entire disclosure whereof is expressly incorporated herein by reference, which claims priority under 35 U.S.C. §119 of Japanese Patent Application No. 2001-128555, filed Apr. 26, 2001.

BACKGROUND OF THE INVENTION

1. Field of the Invention

This invention relates to hydrogen storage alloys useful as a material for transportation and storage of hydrogen, and more particularly to magnesium-based hydrogen storage alloys having a large hydrogen storage quantity at a lower temperature under a lower pressure.

2. Description of Related Art

Recently, a hydrogen energy is expected as a petroleum alternative energy. However, there are left many problems to be solved such as infrastructure building, safety and the like for putting the hydrogen energy into practice.

When hydrogen is filled into a high pressure steel bottle, a volume can be compressed to about $1/150$ or to about $1/800$ at a liquefied state. On the other hand, hydrogen storage alloys can occlude (absorb) a gaseous hydrogen therein and store as a solid, so that a volume of hydrogen can be apparently compressed to about $1/1000$. Furthermore, the hydrogen stored in the hydrogen storage alloys is simple in the handling as compared with a liquid hydrogen or a high pressure hydrogen gas. Therefore, there is a great merit in practical use when hydrogen is transported and stored by using the hydrogen storage alloys, and it is advantageous in the safety because it is not required to handle hydrogen as a high pressure gas or a liquid.

And also, hydrogen can be absorbed or desorbed only by adjusting a temperature or a pressure in the hydrogen storage alloys, so that it is possible to build a cheap hydrogen storage equipment by using the hydrogen storage alloys and it is attempted to reduce energy cost.

From the above reasons, or from a viewpoint of a future energy agenda, it is urgently demanded to develop hydrogen storage alloys for transporting and storing hydrogen in a high performance.

As the conventionally discovered hydrogen storage alloys, there are mainly known binary intermetallic compounds of $AB_5$ type such as $LaNi_5$ or the like, $AB_2$ type such as $ZrMn_2$ or the like, AB type such as TiFe or the like, and $A_2B$ type such as $Mg_2Ni$ or the like. Among them, a hydrogen storage quantity of the hydrogen storage alloys other than $Mg_2Ni$ is as small as about 1.4 mass % in $LaNi_5$, about 1.7 mass % in $ZrMn_2$, and about 1.8 mass % in TiFe based on the weight of the alloys, which is mainly composed of a relatively heavy element such as a rare earth element or Zr, so that it is difficult to increase the hydrogen storage quantity per the weight, and V and the like are expensive and are costly less in the merit.

On the other hand, $Mg_2Ni$ as a typical example of $A_2B$ type alloy is about 3.6 mass % in the hydrogen storage quantity, which is considerably larger than that of the other alloys. However, it is demanded to develop a hydrogen storage alloys with a higher capacity. Particularly, hydrogen storage alloys mainly composed of magnesium are known to have a very large hydrogen storage performance. Moreover, a hydrogen storage quantity of magnesium metal itself ($H_2/(H_2+Mg)$) reaches 7.6 mass %.

However, the magnesium-based hydrogen storage alloys are not put into a practical use up to the present time. Because, it is considered to be difficult to initially activate the magnesium alloys. That is, magnesium is easy to absorb hydrogen and to form a stable hydride, so that it is required to maintain at high temperature and high pressure state of 350-450° C. and 10-20 MPa for absorbing and desorbing hydrogen, which becomes difficult to put into the practical use as a hydrogen storage alloy.

SUMMARY OF THE INVENTION

It is, therefore, an object of the invention to provide magnesium-based hydrogen storage alloys capable of easily absorbing and desorbing a greater quantity of hydrogen at practical conditions (low temperature and low pressure).

The inventors have made various studies for solving the above problems inherent to the conventional magnesium-based hydrogen storage alloys to achieve the above object, and found that there is a constant relationship between an initial activation property and a metal structure, and as a result, the invention has been accomplished adding a metallographical consideration.

That is, the invention lies in a magnesium-based hydrogen storage alloys comprising a metallic magnesium (Mg) and a magnesium-containing intermetallic compound ($Mg_xM_y$, wherein y is 1−x) and containing not less than 60 mass % of magnesium in total, and having a phase of a primarily crystallized magnesium-containing intermetallic compound in its solidification structure. In this case, it is favorable that an amount of metallic magnesium occupied in total magnesium ($\geqq 60$ mass %) is about 7-45 mass % and the remainder is magnesium in the magnesium-containing intermetallic compound. Furthermore, it is favorable that an amount of magnesium in the intermetallic compound is about 16-63 mass %.

In the invention, an alloying element constituting the magnesium-containing intermetallic compound is preferable to be at least one element selected from the group consisting of Al, Si, Ca, Co, Ni, Cu, Sr, Y, Pd, Sn, Ba and Ln (lanthanide elements). And also, it is favorable to be initially activated at a temperature of not higher than 300° C. under a hydrogen pressure condition of not more than 3 MPa.

DETAILED DESCRIPTION OF THE INVENTION

As mentioned above, the alloys mainly composed of magnesium are characterized by having a large hydrogen storing quantity but has a drawback that an initial activation property capable of absorbing and desorbing hydrogen is poor.

This drawback is considered due to the fact that the metallic magnesium phase itself is poor in the catalytic action through the dissociation of a hydrogen gas molecule and that the diffusion rate of hydrogen in a magnesium hydride produced on the surface of the hydrogenation is slow, the hydrogenation is not proceeded into the inside of the substrate.

Based on the above knowledge, the invention improves the initial activation property by controlling the solidification structure of magnesium or magnesium-containing intermetallic compound while maintaining a large hydrogen storage property inherent to magnesium. The thus developed magnesium-based hydrogen storage alloys according to the invention are magnesium (hereinafter referred to as Mg) as an essential component and contains Mg-containing intermetallic compound capable of occluding hydrogen.

As an alloying element forming the intermetallic compound by bonding to Mg (hereinafter abbreviated as M), use may be made of at least one element selected from the group consisting of Ln (lanthanide elements), Ni, Ca, Al, Ba, Cu, Pd, Si, Sr, Y and Sn. These elements form an intermetallic compound of a general formula: $Mg_xM_y$ equilibrating with a Mg phase.

In the invention, the $Mg_xM_y$ intermetallic compound is used as a hydrogen storage alloy and formed by mixing the $Mg_xM_y$ intermetallic compound and metallic Mg at a given composition ratio and melting and casting and alloying them. In this case, a two phase comprising Mg phase and $Mg_xM_y$ intermetallic compound phase is produced accompanied with eutectic reaction from a liquid phase during the solidification to form a hydrogen storage alloy, but it is important to have a composition precipitating a primary crystal of Mg-containing intermetallic compound without initially precipitating Mg during the solidification.

In general, Mg phase is precipitated as a primary crystal during the solidification in alloys having a Mg content higher than an eutectic point, while $Mg_xM_y$ intermetallic compound phase is precipitated as a primary crystal during the solidification in alloys having a Mg content lower than an eutectic point.

Figure 1:
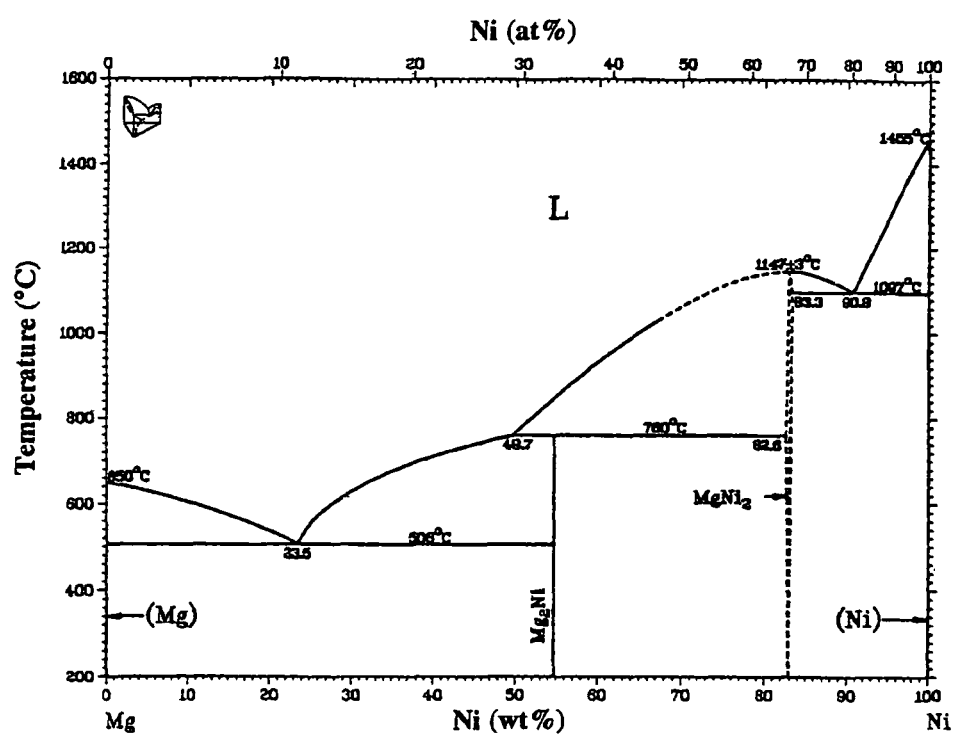
FIG. 1 is a diagram of a Mg—Ni series metal.
Figure 2:
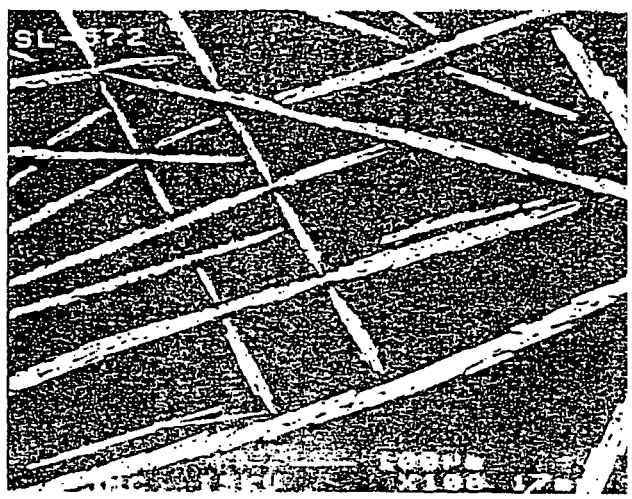
FIG. 2 is a photograph of the metal structure of a Mg—Ni hydrogen storage alloy according to the invention.
Figure 3:
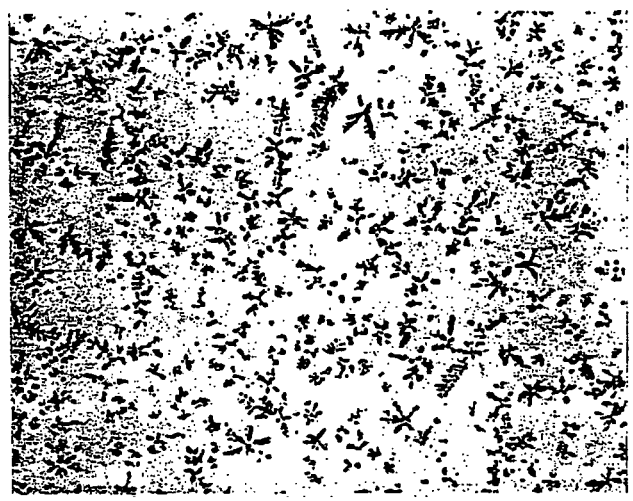
FIG. 3 is a photograph of metal structure of a Mg—Ni hydrogen storage alloy according to the comparative example.

Although a phase diagram of Mg—Ni binary alloy is shown in FIG. 1, when a total amount of Mg including metallic Mg of a matrix portion is less than an eutectic point (Mg: 76.5 mass %), for example, within a range of 60-76.4 mass %, a structure as shown in a metallic structure photograph (×100 magnification) of FIG. 2, i.e. a structure wherein $Mg_xM_y$ intermetallic compound is precipitated as a primary crystal is produced during the solidification. On the other hand, when the total amount of Mg exceeds 77 mass %, a structure as shown in a metallic structure photograph (×100 magnification) of FIG. 3, i.e. a structure wherein the metallic Mg pointedly dispersed in the matrix portion (mixed phase of Mg and $Mg_2Ni$) is precipitated as a primary crystal.

In the former case (FIG. 2), M element (other than Ni) is easily activated in the first hydrogenation of $Mg_xM_y$ phase to decompose into a hydride of the M element or two phases of M element and Mg hydride phase to thereby cause dismutation reaction. The hydride of the M element or the M element produced by this dismutation reaction provides a diffusion (introduction) path of hydrogen in Mg phase and acts as a catalyst dissipating hydrogen gas molecule into monoatom. For this end, the Mg-based hydrogen storage alloy can be easily and initially activated to easily occlude a great amount of hydrogen.

Moreover, when the M element is Ni, $Mg_2Ni$ intermetallic compound itself produced is high in the catalytic performance and reacts with hydrogen to directly form $Mg_2NiH_4$, which forms a hydrogen diffusion path in the Mg phase, so that these alloys are also easily and initially activated likewise the aforementioned M element.

In the latter case (FIG. 3), when the Mg phase itself solidified as a primary crystal is hydrogenated, a stable hydride is formed on the surface. As a result, a hydrogen diffusion rate in the Mg hydride becomes slow and hence hydrogenation does not proceed into the inside, while the Mg phase itself is poor in the catalytic action for the dissipation of hydrogen gas molecule and the hydrogen diffusion path is not formed in the alloy, so that the activation is considerably difficult. Therefore, hydrogen can not be occluded to a theoretical occlusion quantity.

In the hydrogen storage alloys according to the invention, the total amount of Mg including Mg of the intermetallic compound is not less than 60 mass % from a viewpoint of obtaining a theoretical hydrogen occlusion quantity of not less than 5 mass %. The reason is described as follows. Considering a case that the above Mg intermetallic compound is $Mg_xM_y$, when hydrogen is stored in these alloys to hydrogenate $Mg_2Ni$, there are produced the following reaction formulae (1) and (2):

$$Mg_2Ni+2H_2 \rightarrow Mg_2NiH_4 \; (4H/Mg_2Ni=3.7 \text{ mass \%}) \quad (1)$$

$$Mg+H_2 \rightarrow MgH2 \; (2H/Mg=8.2 \text{ mass \%}) \quad (2)$$

As seen from the formulae (1) and (2), when $Mg_2Ni$ and Mg are hydrogenated, 2 mol of hydrogen atom bonds to Mg/mol irrespectively of the form difference. That is, when Mg is 100 mass %, the hydrogen occlusion quantity is 8.2 mass %, so that in order to ensure a hydrogen occlusion quantity of 5.0 mass %, Mg content is required to be not less than 60 mass % (5.0 mass %/8.2 mass %×100≅60%).

On the other hand, the upper limit of the total Mg amount is an eutectic point composition as mentioned above. The upper limit of Mg mass % in each alloying element (M) is shown in Table 1 together with a compound form.

TABLE 1

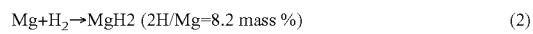

| Element | Mg content | Compound | Element | Mg content | Compound |
|---------|-----------|----------|---------|-----------|----------|
| Ni | 77 | $Mg_2Ni$ | Sr | 82 | $Mg_{17}Sr_2$ |
| Ca | 84 | $Mg_2Ca$ | Y | 74 | $Mg_{24}Y_5$ |
| Al | 68 | $Mg_{17}Al_{12}$ | La | 90 | $Mg_{12}La$ |
| Ba | 88 | $Mg_{17}Ba_2$ | Si | 98 | $Mg_2Si$ |
| Cu | 70 | $Mg_2Cu$ | Sn | 64 | $Mg_2Sn$ |
| Pd | 73 | $Mg_6Pd$ | | | |

Note)
Mg content is mass % of an eutectic point composition.

EXAMPLE

A sample used in this example is prepared by adjusting components as shown in Table 2, melting them in a high frequency induction apparatus, and casting in a water-cooling iron mold. Then, the hydrogen storage alloys prepared for test is pulverized to a size of about several mesh and weighed by 2 g. The thus weight sample is sufficiently evacuated at 300° C. and kept at this temperature under a hydrogen pressure of 3 MPa for 24 hours or 120 hours, during which a hydrogen storage quantity is calculated from a pressure change to evaluate an initial activation property. The evaluated results are shown in Table 2 together with compositions of example alloys and comparative example alloys.

TABLE 2

|  | Composition (mass ratio) | Activation rate After 24 hours (mass %) | Activation rate After 120 hours (mass %) | $Mg_xM_y$ (mass %) | | | Metallic magnesium (mass %) |
|---|---|---|---|---|---|---|---|
| Example 1 | $Mg_{65}Al_{35}$ | 4.4 | 5.0 | Mg | 45 | Al 35 | 20 |
| Example 2 | $Mg_{70}Si_{30}$ | 4.1 | 5.1 | Mg | 52 | Si 30 | 18 |
| Example 3 | $Mg_{70}Ca_{30}$ | 4.2 | 5.1 | Mg | 36 | Ca 30 | 34 |
| Example 4 | $Mg_{70}Ni_{30}$ | 4.9 | 5.3 | Mg | 25 | Ni 30 | 45 |
| Example 5 | $Mg_{60}Cu_{40}$ | 4.0 | 5.0 | Mg | 31 | Cu 40 | 29 |
| Example 6 | $Mg_{75}Sr_{25}$ | 4.2 | 5.3 | Mg | 59 | Sr 25 | 16 |
| Example 7 | $Mg_{70}Y_{30}$ | 4.7 | 5.2 | Mg | 39 | Y 30 | 31 |
| Example 8 | $Mg_{65}Pd_{35}$ | 4.6 | 5.1 | Mg | 48 | Pd 35 | 17 |
| Example 9 | $Mg_{60}Sn_{40}$ | 4.0 | 5.0 | Mg | 16 | Sn 40 | 44 |
| Example 10 | $Mg_{70}Ba_{30}$ | 4.1 | 5.0 | Mg | 45 | Ba 30 | 25 |
| Example 11 | $Mg_{70}La_{30}$ | 4.3 | 5.0 | Mg | 63 | La 30 | 7 |
| Example 12 | $Mg_{70}Ni_{20}Ca_{10}$ | 4.6 | 5.2 | Mg | 29 | Ni 20 | 41 |
|  |  |  |  |  |  | Ca 10 |  |
| Example 13 | $Mg_{70}Ni_{10}Ca_{10}La_{10}$ | 4.5 | 5.1 | Mg | 41 | Ni 10 | 29 |
|  |  |  |  |  |  | Ca 10 |  |
|  |  |  |  |  |  | La 10 |  |
| Comparative Example 1 | Mg | 0.1 | 0.7 | Mg | 100 | — — | 100 |
| Comparative Example 2 | $Mg_{78}Ni_{22}$ | 0.2 | 1.0 | Mg | 18 | Ni 22 | 60 |

From the above test results, it has been confirmed that the Mg intermetallic compound is precipitated as a primary crystal in all alloys of Examples 1-13.

Moreover, in single Mg body of Comparative Example 1 and the alloy of Comparative Example 2 having a composition of solidifying Mg as a primary crystal, the theoretical hydrogen occlusion quantity is large because the hydrogen occlusion quantity is determined by the Mg content, but they can not be activated under low temperature and low pressure conditions of 300° C. and 3 MPa, so that the hydrogen occlusion quantity after 120 hours is small. On the other hand, in the alloys of Examples 1-13, it is possible to occlude hydrogen up to substantially an equilibrium state after 120 hours under the above test conditions (300° C., 3 MPa). As a result, it can be seen that the alloys according to the invention can be sufficiently activated even under practical conditions while maintaining the high hydrogen storage performance of Mg-based alloys.

As mentioned above, according to the invention, there can be provided Mg-based hydrogen storage alloys having a high hydrogen storage property suitable for transporting and storing hydrogen. Furthermore, the invention facilitates the occlusion and discharge of hydrogen under practical environment, so that it contributes to minimize machines and equipments using such alloys and to decrease the cost.

What is claimed is:

1. A magnesium-based hydrogen storage alloy which comprises a first phase of metallic magnesium (Mg) and second phase of a magnesium-containing intermetallic compound of formula $Mg_xM_y$, where M represents an alloying element forming the intermetallic compound by bonding Mg, x represents a mass percent of Mg and y represents a mass percent of M, which comprises from about 16 mass-% to about 63 mass-% of magnesium, the alloy comprising magnesium in a total amount which is not less than 60 mass-% and having a phase of a primary crystallized magnesium-containing intermetallic compound in its solidification structure, and wherein the total amount of magnesium is sufficient for obtaining a theoretical hydrogen occlusion quantity in the alloy of not less than 5 mass-%, and wherein the alloy has been initially activated at a temperature of not higher than 300° C. under a hydrogen pressure condition of not more than 3 MPa.

2. The hydrogen storage alloy of claim 1, wherein the total amount of magnesium is not higher than that of a eutectic point composition.

3. The hydrogen storage alloy of claim 1, wherein M comprises at least one element selected from Al, Si, Ca, Co, Ni, Cu, Sr, Y, Pd, Sn, Ba and lanthanide elements.

4. The hydrogen storage alloy of claim 1, wherein M comprises at least one element selected from Si, Co, Ni, Cu, Sr, Y, Pd, Ba and lanthanide elements.

5. The hydrogen storage alloy of claim 1, wherein M comprises Ni.

6. The hydrogen storage alloy of claim 5, wherein the total amount of magnesium is not higher than 76.4 mass-%.

7. The hydrogen storage alloy of claim 1, wherein the first phase accounts for from about 7 mass-% to about 45 mass-% of the total amount of magnesium.

8. A magnesium-based hydrogen storage alloy which comprises a first phase of metallic magnesium (Mg) and second phase of a magnesium-containing intermetallic compound of formula $Mg_xM_y$, where M represents an alloying element forming the intermetallic compound by bonding to Mg, x represents a mass percent of Mg and y represents a mass percent of M, which comprises from about 16 mass-% to about 63 mass-% of magnesium, the alloy comprising magnesium in a total amount which is not less than 60 mass-% and having a phase of a primary crystallized magnesium-containing intermetallic compound in its solidification structure, and wherein the total amount of magnesium is sufficient for obtaining a theoretical hydrogen occlusion quantity in the alloy of not less than 5 mass-%, and wherein the alloy has hydrogen occluded therein.

9. The hydrogen storage alloy of claim 8, wherein the alloy has not less than 5 mass-% of hydrogen occluded therein.

10. A magnesium-based hydrogen storage alloy which comprises a first phase of metallic magnesium (Mg) and second phase of a magnesium-containing intermetallic compound of formula $Mg_xM_y$, where M represents an alloying element forming the intermetallic compound by bonding to Mg, x represents a mass percent of Mg and y represents a mass percent of M, which comprises from about 16 mass-% to about 63 mass-% of magnesium, the alloy comprising magnesium in a total amount of from not less than 60 mass-% to 76.4 mass-%, which amount is sufficient to obtain a theoretical hydrogen occlusion quantity in the alloy of not less than 5 mass-%, and having a phase of a primary crystallized magnesium-containing intermetallic compound in its solidification structure, and wherein the alloy has been initially activated at a temperature of not higher than 300° C. under a hydrogen pressure condition of not more than 3 MPa.

11. The hydrogen storage alloy of claim 10, wherein M comprises at least one element selected from Al, Si, Ca, Co, Ni, Cu, Sr, Y, Pd, Sn, Ba and lanthanide elements.

* * * * *